United States Patent
Evans et al.

(10) Patent No.: US 7,289,700 B1
(45) Date of Patent: Oct. 30, 2007

(54) BLAZED GRATING OPTICAL FIBER POLARIZING COUPLER

(75) Inventors: Douglass C. Evans, San Diego, CA (US); Joseph D. Aboumrad, San Diego, CA (US); Earl E. Floren, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/444,809

(22) Filed: May 19, 2006

(51) Int. Cl.
  *G02B 6/34* (2006.01)
  *G02B 6/26* (2006.01)
  *G02B 6/42* (2006.01)

(52) U.S. Cl. .............. 385/37; 385/31; 385/39; 385/50

(58) Field of Classification Search .......... 385/37
See application file for complete search history.

(56) References Cited

U.S. PATENT DOCUMENTS

| | | | | |
|---|---|---|---|---|
| 3,871,742 | A | * | 3/1975 | Kaminow et al. ............ 385/37 |
| 5,778,119 | A | * | 7/1998 | Farries ........................ 385/37 |
| 6,870,991 | B2 | | 3/2005 | Ohta et al. |

\* cited by examiner

*Primary Examiner*—Frank G. Font
*Assistant Examiner*—Ryan Lepisto
(74) *Attorney, Agent, or Firm*—Peter A. Lipovsky; Allan Y. Lee; J. Eric Anderson

(57) ABSTRACT

The blazed grating optical fiber polarizing coupler comprises a first optical fiber with a Bragg diffraction grating formed in its core at substantially the Brewster's angle with respect to an optical axis of the first optical fiber, a second optical fiber, also with a Bragg diffraction grating formed in its core at substantially the Brewster's angle with respect to the optical axis of the second optical fiber. The Bragg diffraction grating of the first optical fiber is oriented substantially parallel to the Bragg diffraction grating of the second optical fiber so that the cladding of the first optical fiber and the cladding of the second optical fiber are interposed between the cores of the first and second fibers. An optical signal may be coupled from the first optical fiber into the second optical fiber and polarized in the process.

13 Claims, 7 Drawing Sheets x,y Orthogonal Polarization

BLAZED GRATING OPTICAL FIBER POLARIZING COUPLER

FEDERALLY-SPONSORED RESEARCH AND DEVELOPMENT

The Blazed Grating Optical Fiber Polarizing Coupler was developed with federal funds and is assigned to the United States Government. Licensing and technical inquiries may be directed to the Office of Patent Counsel, Space and Naval Warfare Systems Center, San Diego, Code 20012, San Diego, Calif., 92152; telephone (619) 553-3001, facsimile (619) 553-3821. Reference Navy Case No. 82959.

BACKGROUND OF THE INVENTION

Typical existing techniques for selectively removing one polarization state of the light propagating in a single-mode optical fiber involve the use of bulk optics, loops of fiber, or mounting blocks that do not retain the approximate size of optical fiber. In applications such as optical fiber sensing, the fiber and polarizer may have to be wrapped tightly on a small mandrel or inserted into a cable. Use of the above-described polarizing techniques in such applications precludes locating the device directly on a mandrel, thereby resulting in packaging volume and design effort being committed to the incorporation of the device elsewhere in the system. A need exists for a polarizing coupler that retains the approximate size of an optical fiber.

BRIEF DESCRIPTION OF THE DRAWINGS

Throughout the several views, like elements are referenced using like references.

DESCRIPTION OF EMBODIMENTS

Figure 1:
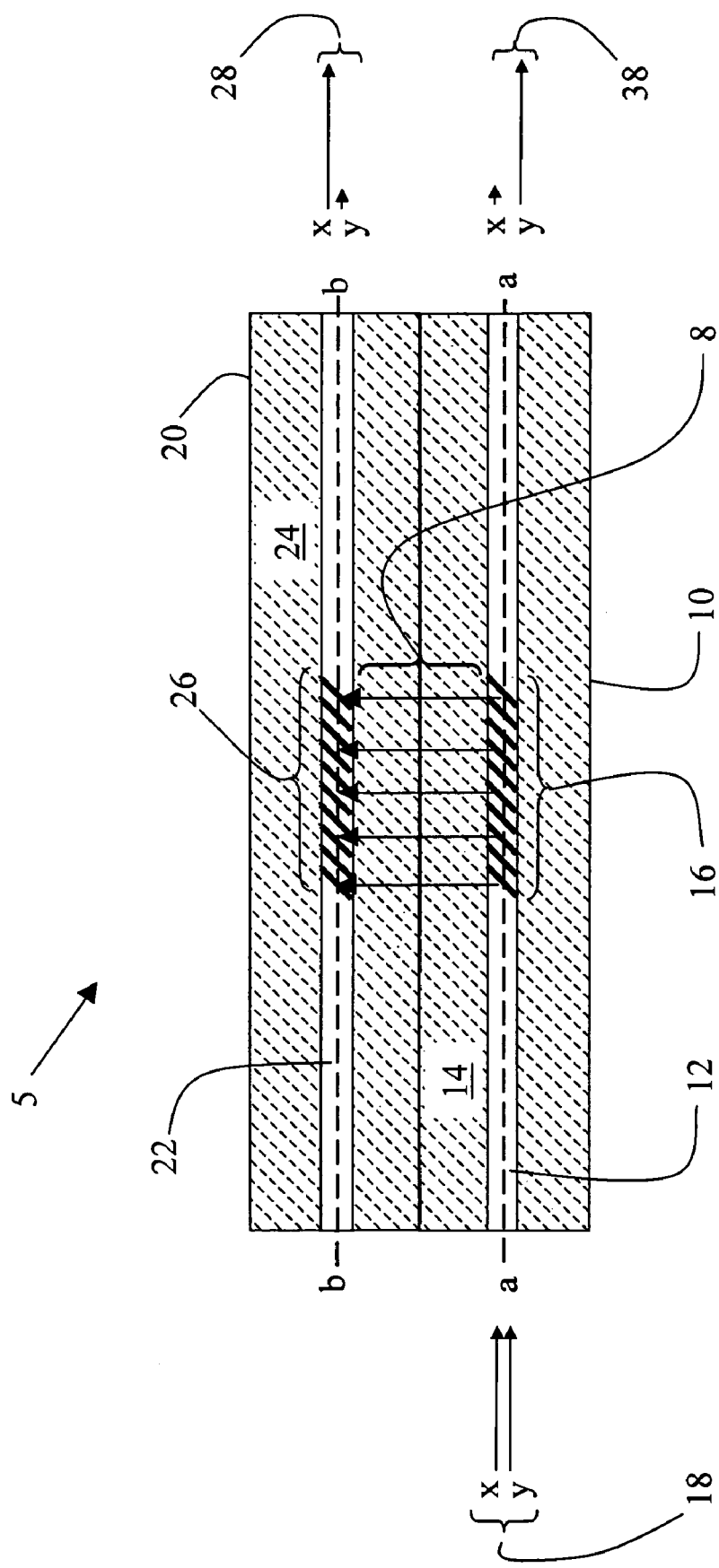
FIG. 1 is a cross-sectional, side view of one embodiment of the polarizing coupler.

FIG. 1 is a cross-sectional, side view of one embodiment of a blazed grating optical fiber polarizing coupler (hereinafter "polarizing coupler") 5. The polarizing coupler 5 comprises a first optical fiber 10 optically coupled to a second optical fiber 20. An optical signal 18, having a wavelength λ may be directed into the polarizing coupler 5 where it is converted into optical signal 8 and is propagated along second optical axis b-b of polarizing coupler 5 as optical signal 28, wherein optical signal 28 is highly, linearly polarized. A portion of optical signal 18 is also converted into optical signal 38, which is propagated along first optical axis a-a of polarizing coupler 5.

Figure 2:
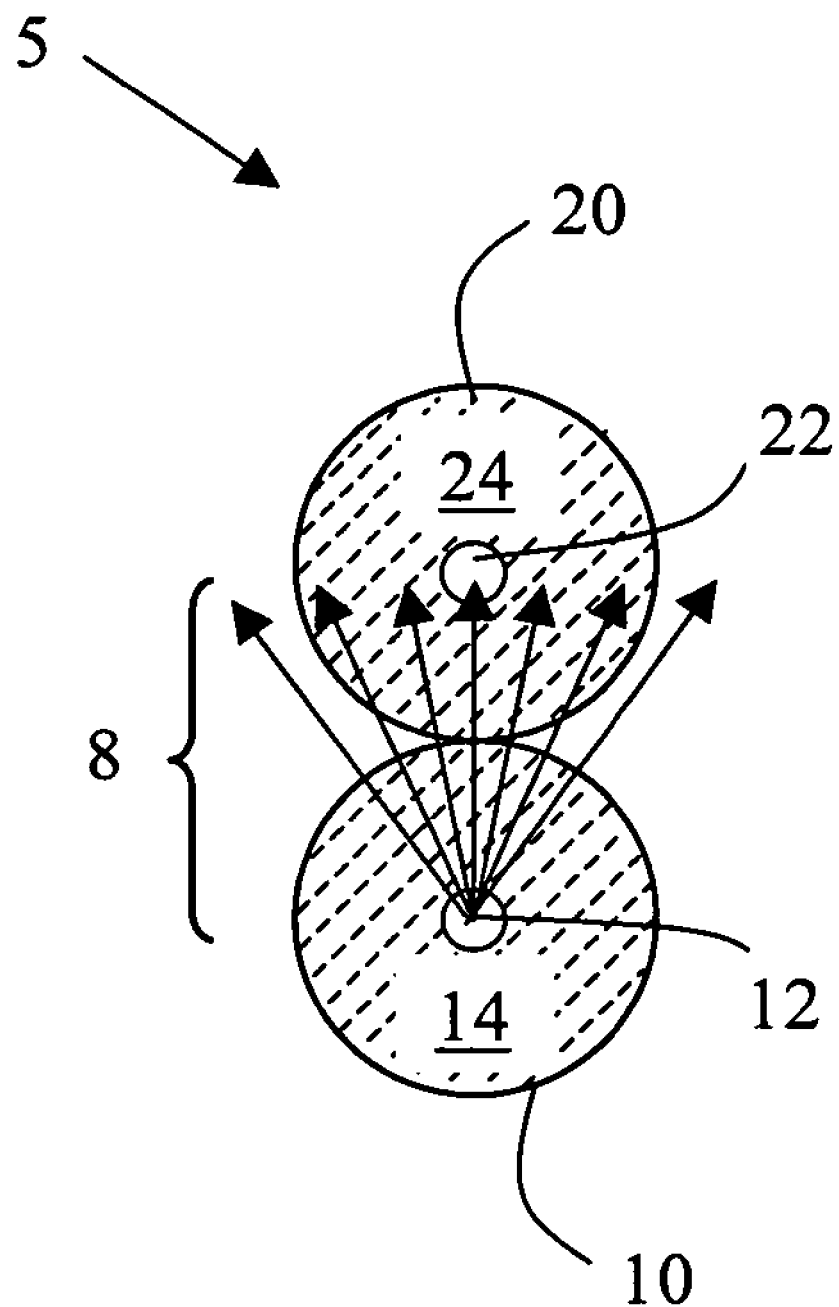
FIG. 2 is a cross-sectional, end view of the polarizing coupler depicted in FIG. 1.

FIG. 2 is a cross-sectional, end view of the polarizing coupler 5 illustrating the first optical fiber 10, first core 12 and a first cladding 14. FIG. 2 also shows a second optical fiber 20, a second core 22, and a second cladding 24. The first and second cores 12 and 22 are arranged parallel to each other as shown in FIG. 2.

Figure 3:
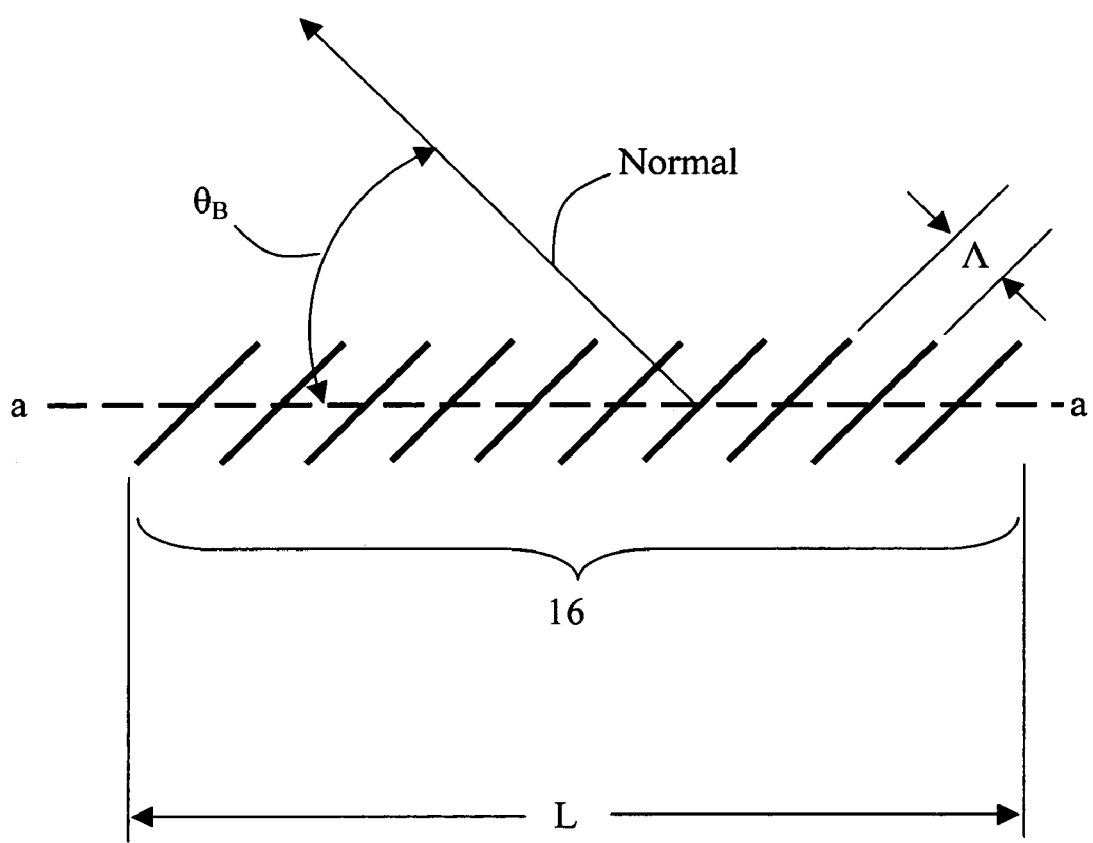
FIG. 3 is an illustration of the orientation of the Bragg diffraction gratings shown in FIG. 1 with respect to an optical fiber axis.

FIGS. 1 and 3 illustrate a first Bragg diffraction grating 16 formed in the first core 12. The angle of the first Bragg diffraction grating 16 corresponds to Brewster's angle $\theta_B$ of the first core 12. Brewster's angle $\theta_B$, is given by:

$$\theta_B = \tan^{-1}\left(\frac{n_2}{n_1}\right)$$

where $n_1$ and $n_2$ are the refractive indices of the first core 12 and the first Bragg diffraction grating 16 respectively. By way of example, when using a telecom optical fiber with an index of refraction of about 1, the first Bragg diffraction grating may be blazed at a substantially 45-degree angle with respect to the first optical axis a-a of first core 12. The angle of the second Bragg diffraction grating 26 corresponds to Brewster's angle $\theta_B$ of the second core 22. Brewster's angle $\theta_B$ of the second core 22 is calculated according to the following equation:

$$\theta_B = \tan^{-1}\left(\frac{n_4}{n_3}\right)$$

where $n_3$ and $n_4$ are the refractive indices of the second core 22 and the second Bragg diffraction grating 26 respectively. By way of example, when using a telecom optical fiber with an index of refraction of about 1, the second Bragg diffraction grating 26 may be formed in the second core 22 at a substantially 45-degree angle with respect to the second optical axis b-b of the second core 22. The first optical fiber 10 and the second optical fiber 20 are oriented such that their respective Bragg diffraction gratings (16 and 26) are substantially parallel to each other as shown in FIG. 1 so as to allow optical signal 18, in the first core 12, to be polarized and coupled into the second core 22 so that a portion of optical signal 18 is transformed into optical signal 8, then into optical signal 28. Optical signal 28 is highly linearly polarized as compared to optical signal 18. The portion of optical signal 18 that is not transformed into optical signal 8 is instead transformed into optical signal 38, which is highly, linearly polarized as compared to optical signal 8. In one embodiment, second optical fiber 20 may be substantially symmetrical to first optical fiber 10.

The parallel orientation of the first and second Bragg diffraction gratings 16 and 26, as shown in FIG. 1, allows optical signal 18 to be polarized by the first Bragg diffraction grating 16 and diffracted towards the second Bragg diffraction grating 26. The portion of optical signal 18 that is diffracted towards the second Bragg diffraction grating 26 is represented by optical signal 8, as shown in FIG. 1. A portion of optical signal 8 is then further polarized by the second Bragg diffraction grating 26 and propagated through the second core 22. The portion of optical signal 8 that is polarized by the second Bragg diffraction grating 26 and propagated through the second core 22 is represented by optical signal 28 as shown in FIG. 1. In terms of x and y orthogonal polarization, optical signal 28 exhibits a greatly diminished y component as compared with optical signal 18. The portion of optical signal 18 that is not diffracted by the first Bragg diffraction grating 16 is represented by optical signal 38. In terms of x and y orthogonal polarization, optical signal 38 exhibits a greatly diminished x component as compared with optical signal 18.

Figure 6:
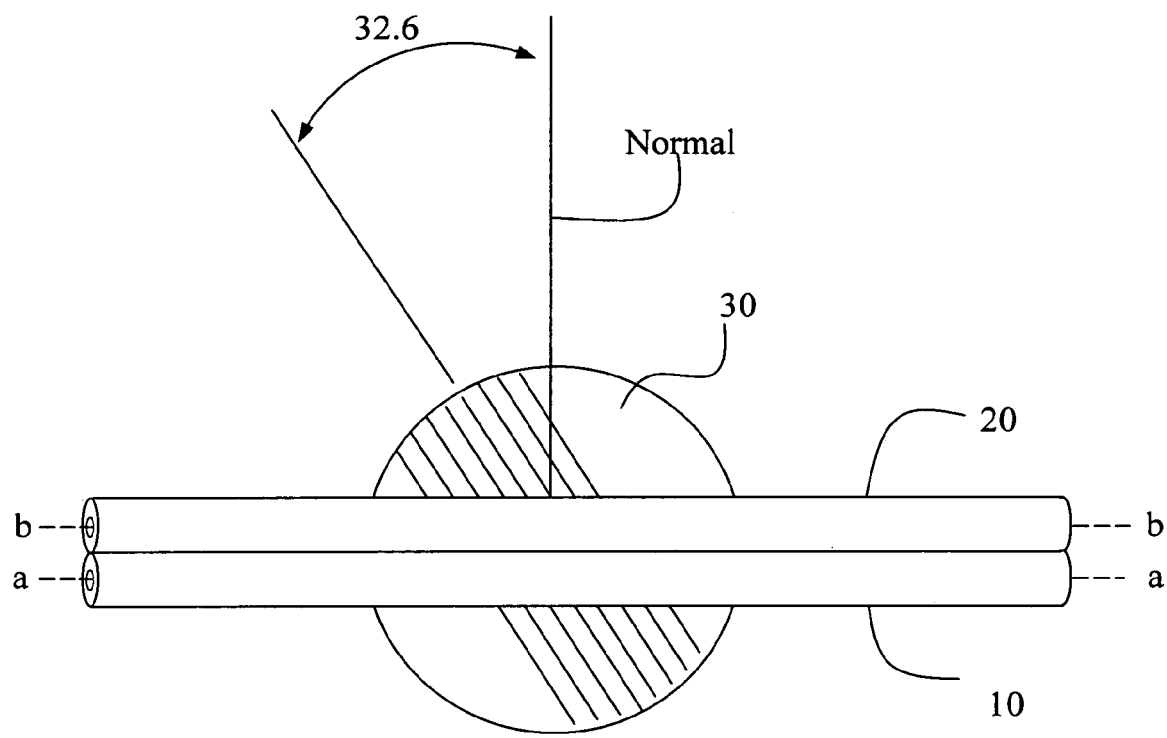
FIG. 6 is an illustration showing the orientation of a holographic phase mask with respect to optical fibers during fabrication of the polarizing coupler.
Figure 7:
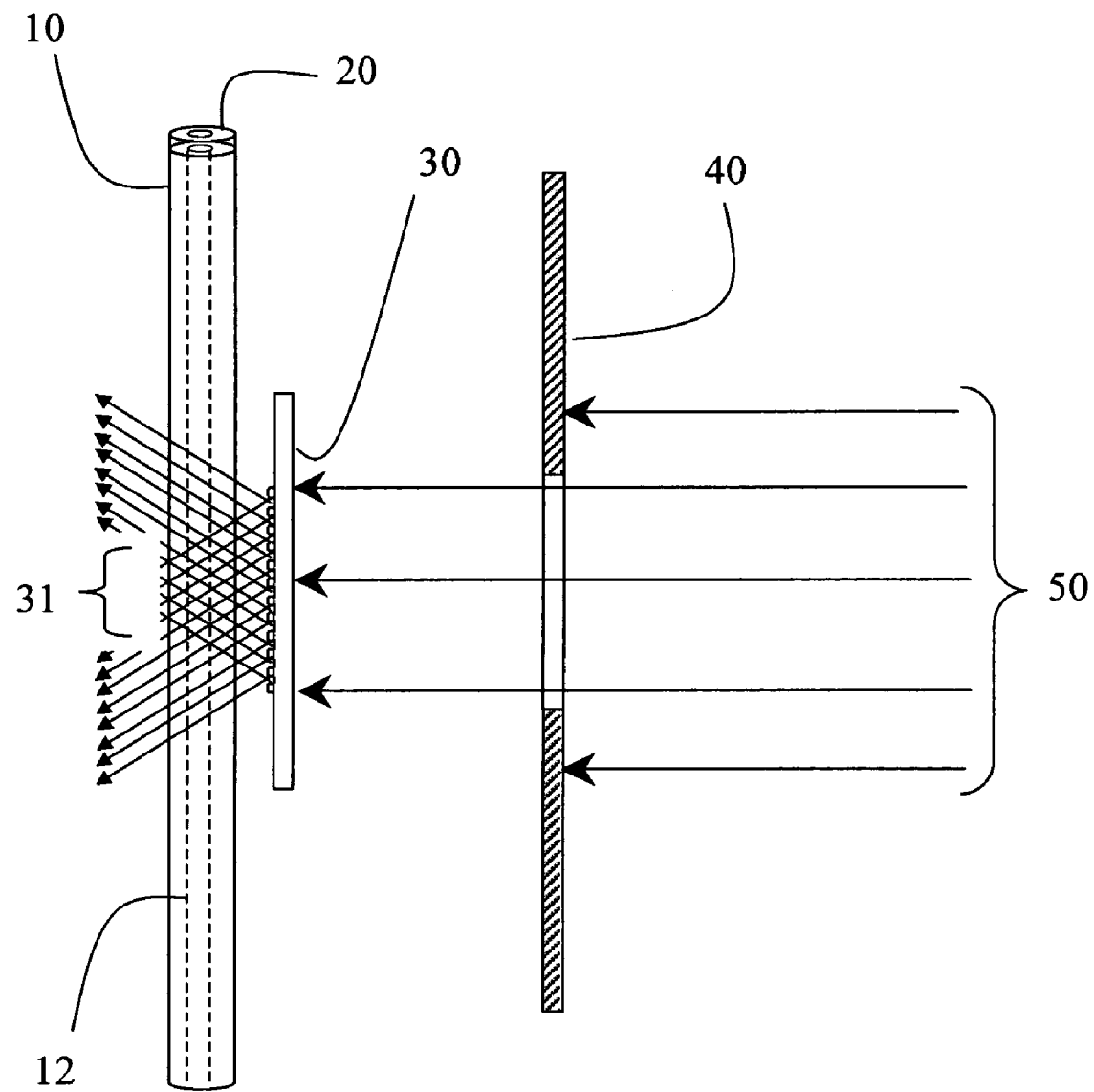
FIG. 7 is a depiction of the fabrication setup for the polarizing coupler.

FIGS. 6 and 7 exemplify how the first and second Bragg diffraction gratings 16 and 26 may be formed in first and second optical fibers 10 and 20 by exposing the first and second cores 12 and 22 to ultraviolet laser light 50. The first and second cores 12 and 22 will typically be doped with a substance, not shown, such as germanium, which is relatively absorptive in the ultraviolet portion of the wavelength spectrum. First and second optical fibers 10 and 20 may each be implemented, by way of example, as a Spectran Specialty Photo-sil, FiberCore Specialty, Corning LEAF, or Lucent Truewave optical fiber. An example of a suitable source of ultraviolet laser light 50 for irradiating the first and second cores 12 and 22 is Lambda-Physik Model 205 excimer laser using an argon-fluorine-helium-neon gas mixture that emits an intense beam of ultraviolet laser light 50 at 193 nanometers. An aperture 40 may be used to control the amount of ultraviolet laser light 50 that irradiates first and second cores 12 and 22, as shown in FIG. 7. A holographic phase mask 30 may be placed in close proximity to (almost touching but far enough away to prevent burning of) the first and second optical fibers 10 and 20 and the assembly may be irradiated using ultraviolet laser light 50 for 5-10 minutes. An example of a suitable holographic phase mask 30 is a Lasiris Model PM-193-1.7829-25.4 with its reference axis tilted by 32.6 degrees with respect to the normal of the first and second optical axes a-a and b-b to impart the proper blaze angle into the first and second Bragg diffraction gratings 16 and 26 as shown in FIG. 6. Exposing both first and second optical fibers 10 and 20 simultaneously to the same ultraviolet laser light 50 through the same holographic phase mask 30 causes substantially identical first and second Bragg diffraction gratings 16 and 26 to be formed in both first and second cores 12 and 22 oriented substantially parallel to each other.

The interaction of the ultraviolet laser light 50 with the holographic phase mask 30 results in an interference pattern 31 that projects through the relatively transparent silica of the first and second claddings 14 and 24 and focused on the first and second cores 12 and 22, as shown in FIG. 7. The interference pattern 31 alters the index of refraction of the first and second cores 12 and 22 in a manner that periodically modulates the refractive index of the first and second cores 12 and 22 axially along their lengths. The induced first and second Bragg diffraction gratings 16 and 26 so produced is permanent. That is, the first and second Bragg diffraction gratings 16 and 26 remain in first and second optical fibers 10 and 20 indefinitely after the ultraviolet laser light 50 and holographic phase mask 30 have been removed. The length of the irradiated region, the intensity of the ultraviolet laser light 50, and the exposure time are all factors that control the percentage of optical signal 18 that may be coupled out of the first optical fiber 10 into the second optical fiber 20. The longer the irradiated region, the more optical signal 18 will be scattered out of the first optical fiber 10 and optical signal 8 will be scattered into the second optical fiber 20. If accuracy can be maintained, and drift avoided, longer exposure time and greater intensity of the ultraviolet laser light 50 will lead to better gratings and thus a greater percentage of optical signal 18 that may be coupled out of the first optical fiber 10 into the second optical fiber 20. In one embodiment, the length L of the first and second Bragg diffraction gratings 16 and 26 (See FIGS. 1 & 3) was in the range of about five to about seven millimeters. By way of example, the period $\Lambda$ between perturbations of the refractive indices of the cores 12 and 22 may be approximately one half the wavelength of the optical signal in the core. However, it is to be understood that the length L may be any length as required to suit the needs of a particular application.

Optical signal 18 propagates through first optical fiber 10 until it reaches the first Bragg diffraction grating 16. The period $\Lambda$ of the first Bragg diffraction grating 16 is selected to cause a percentage of optical signal 18 to scatter in a direction perpendicular to the first optical axis a-a of first optical fiber 10. The theoretical period $\Lambda$ of the perturbations of the indices of refraction along optical axis a-a in Bragg diffraction grating 16 is defined according to the equation, $\Lambda=(\lambda_s/n_1)$. Where $\lambda_s$ is the wavelength of optical signal 18 in free space and $n_1$ is the refractive index of first core 12. The period $\Lambda$ of the second Bragg diffraction grating 26 is selected to cause a percentage of optical signal 8 to scatter in a direction parallel to the second optical axis b-b of second optical fiber 20. The period $\Lambda$ is also defined by the above equation, where $\lambda_s$ is the wavelength of optical signal 8 in free space and $n_1$ is the refractive index of second core 22. However, in practice, the period $\Lambda$ generally approaches $(\lambda_s/n_1)$. Typically, $n_1$ is approximately equal to 1.0. Therefore, $\Lambda$ is approximately equal to $\lambda_s$.

As the first Bragg diffraction grating 16 is formed at the Brewster angle $\theta_B$ of the first optical fiber 10, optical signal 18 is substantially polarized as it is diffracted. This polarized optical signal diffracted in a direction perpendicular to the first optical axis a-a of the first optical fiber 10 is shown in FIG. 1 as optical signal 8.

Referring to FIG. 1, in operation, optical signal 18 may be introduced into one end of the first optical fiber 10. Upon reaching the first Bragg diffraction grating 16, a percentage of the optical signal 18 may then be scattered as well as polarized toward the second optical fiber 20 as optical signal 8. A percentage of optical signal 8 is then be further scattered and polarized in a direction of propagation along the second optical fiber 20 by the second Bragg diffraction grating 26 as optical signal 28. The percentage of optical signal 18 that may be scattered and polarized by the first Bragg diffraction grating 16 depends on the length of the first Bragg diffraction grating 16 and the difference in refractive indices between the first Bragg diffraction grating 16 and the first core 12. The percentage of optical signal 8 that may be scattered and polarized by the second Bragg diffraction grating 26 depends on how much of optical signal 8 reaches the second core 22, the length of the second Bragg diffraction grating 26, and the difference in refractive indices between the second Bragg diffraction grating 26 and the second core 22.

Figure 4:
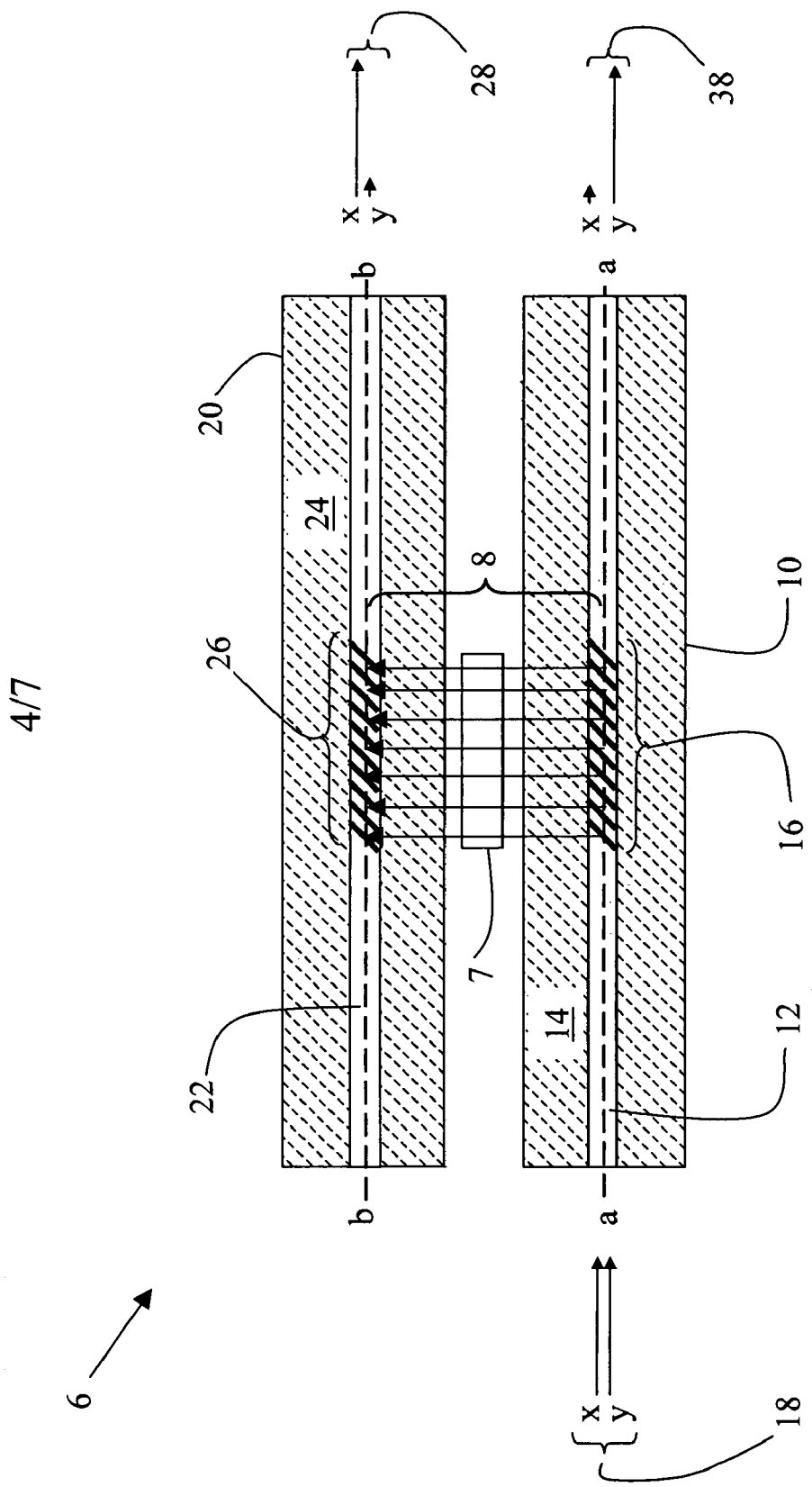
FIG. 4 is a cross-sectional, side view of one embodiment of the polarizing coupler and a lens.
Figure 5:
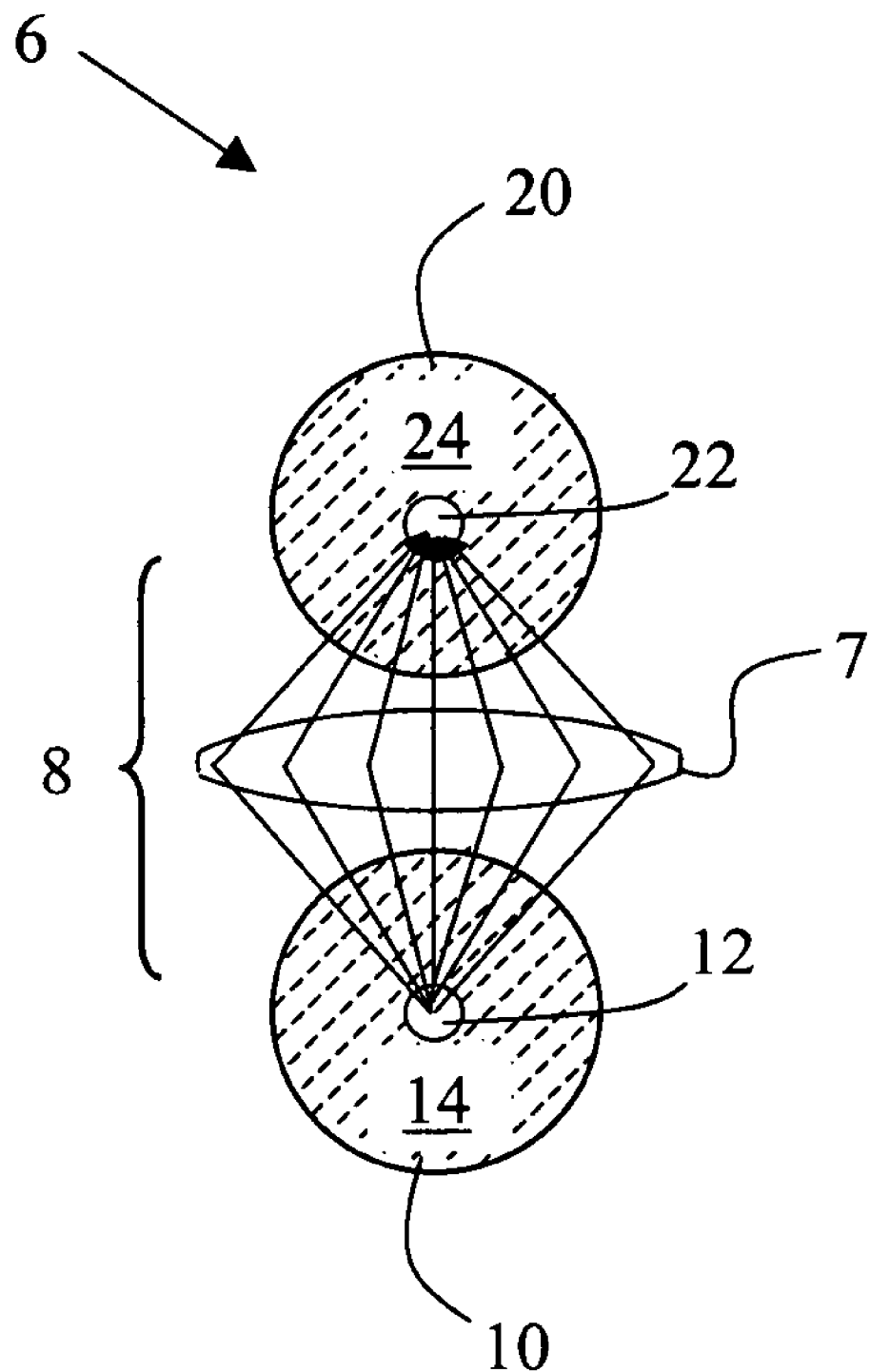
FIG. 5 is a cross-sectional, end view of one embodiment of the polarizing coupler and a lens depicted in FIG. 4.

FIGS. 4 and 5 show polarizing coupler 6 which differs from polarizing coupler 5 in that a lens 7, such as a cylindrical lens may be interposed between the first and second optical fibers 10 and 20 to act as a relay lens to diminish spreading loss of optical signal 8 between the first and second optical fibers 10 and 20 as shown in FIG. 5.

From the above description of the polarizing coupler 5 and 6, it is manifest that various techniques can be used for implementing the concepts of the polarizing coupler 5 and 6 without departing from its scope. Moreover, while the polarizing coupler 5 and 6 has been described with specific reference to certain embodiments, a person of ordinary skill in the art would recognize that changes may be made in form and detail without departing from the spirit and the scope of the polarizing coupler 5 and 6. The described embodiments are to be considered in all respects as illustrative and not restrictive. It should also be understood that the polarizing coupler 5 and 6 is not limited to the particular embodiments described herein, but is capable of many rearrangements, modifications, and substitutions without departing from the scope of the polarizing coupler 5 and 6.

We claim:

1. A fiber polarizing coupler comprising:
a first optical fiber comprising a first cladding, a first core, and a first optical axis, the first core having a first Bragg diffraction grating formed at substantially the Brewster angle with respect to the first optical axis, wherein the first Bragg diffraction grating has a period of approximately $(\lambda_s/n_1)$ along the first optical axis, where $\lambda_s$ is a wavelength of an optical signal in free space and $n_1$ is a refractive index of the first core;
a second optical fiber, comprising a second cladding, a second core, and a second optical axis, the second core having a second Bragg diffraction grating formed at substantially the Brewster angle with respect to the second optical axis; wherein
the first Bragg diffraction grating is oriented substantially parallel to the second Bragg diffraction grating such that the first optical fiber is optically coupled to the second optical fiber; and
the first cladding and the second cladding are interposed between the first and second cores.

2. The fiber polarizing coupler of claim 1, wherein the lengths of the first and second Bragg diffraction gratings are within the range of about 5 to about 7 millimeters.

3. The fiber polarizing coupler of claim 1, wherein the first and second claddings are coterminous.

4. The fiber polarizing coupler of claim 1, wherein the second Bragg diffraction grating has a period of approximately $(\lambda_s/n_2)$ along the second optical axis, where $n_2$ is a refractive index of the second core.

5. The fiber polarizing coupler of claim 1, wherein light optically coupled from the first optical fiber into the second optical fiber is substantially polarized.

6. The fiber polarizing coupler of claim 1, wherein the first and second optical fibers are coterminous.

7. The fiber polarizing coupler of claim 1, further comprising a cylindrical lens, interposed between the first optical fiber and the second optical fiber, the cylindrical lens being capable of diminishing spreading loss between the first and second optical fibers.

8. A fiber polarizing coupler comprising:
a first optical fiber having a core;
a first diffraction grating formed in the core of the first optical fiber at substantially the Brewster's angle with respect to an optical axis of the first optical fiber;
wherein the first diffraction grating has a period of approximately $(\lambda_s/n_1)$ along the first optical axis, where $\lambda_s$ is a wavelength of an optical signal in free space and $n_1$ is a refractive index of the first core, and where the first diffraction grating is capable of scattering light in a direction perpendicular to the optical axis of the first optical fiber such that polarization discrimination of the light is maximized;
a second optical fiber having a core;
a second diffraction grating formed in the core of the second optical fiber at substantially the Brewster's angle with respect to an optical axis of the second optical fiber;
wherein the second optical fiber is in contact with the first optical fiber; and
wherein the second diffraction grating is capable of receiving and then scattering a percentage of the light scattered by the first diffraction grating in a direction of propagation along the optical axis of the second optical fiber such that polarization discrimination of the light is maximized.

9. The fiber polarizing coupler of claim 8, wherein the length of the first and second Bragg diffraction gratings is approximately within the range of about 5 to about 7 millimeters.

10. The fiber polarizing coupler of claim 8, further comprising a cylindrical lens, interposed between the first optical fiber and the second optical fiber, the cylindrical lens being capable of diminishing spreading loss between the first and second optical fibers.

11. The fiber polarizing coupler of claim 8, wherein the first and second optical fibers are substantially symmetrical.

12. The fiber polarizing coupler of claim 8, wherein the second Bragg diffraction grating has a period of approximately $(\lambda_s/n_2)$, where $n_2$ is a refractive index of the second core.

13. A method for polarizing light comprising:
introducing an optical signal into an end of a first optical fiber;
scattering a first percentage of the optical signal in the direction of a second optical fiber with a first Bragg diffraction grating formed at the Brewster angle of the first optical fiber, wherein the first Bragg diffraction grating has a period of approximately $(\lambda_s/n_1)$ along the first optical axis, where $\lambda_s$ is a wavelength of an optical signal in free space and $n_1$ is a refractive index of the first optical fiber;
polarizing the first percentage of the optical signal with the first Bragg diffraction grating;
scattering a second percentage of the optical signal in a direction of propagation along the second optical fiber with a second Bragg diffraction grating formed at the Brewster angle of the second optical fiber, wherein the second Bragg diffraction grating has a period of approximately $(\lambda_s/n_2)$ along the second optical axis, where $n_2$ is a refractive index of the second optical fiber;
polarizing the second percentage of the optical signal with the second Bragg diffraction grating; and
propagating the second percentage of the optical signal through the second optical fiber.

* * * * *